United States Patent [19]
Alexander

[11] Patent Number: 5,553,343
[45] Date of Patent: Sep. 10, 1996

[54] DOCK LEVELER WITH FOLDING BARRIER LIP

[75] Inventor: James C. Alexander, London, Canada

[73] Assignee: United Dominion Industries, Inc., Charlotte, N.C.

[21] Appl. No.: 399,223

[22] Filed: Mar. 6, 1995

[51] Int. Cl.⁶ .................................................. E01D 1/00
[52] U.S. Cl. .................................. 14/71.1; 14/71.3
[58] Field of Search ............................ 14/69.5, 71.1, 14/71.3, 71.7

[56] References Cited

U.S. PATENT DOCUMENTS

| | | | |
|---|---|---|---|
| 5,040,258 | 8/1991 | Hahn et al. | 14/71.3 |
| 5,157,801 | 10/1992 | Alexander | 14/71.3 |
| 5,311,628 | 5/1994 | Springer et al. | 14/71.1 |
| 5,333,339 | 8/1994 | Larsen | 14/71.1 |
| 5,343,583 | 9/1994 | Cook | 14/71.1 X |

FOREIGN PATENT DOCUMENTS 2852888  8/1980  Germany .................... 14/71.1

Primary Examiner—David J. Bagnell
Assistant Examiner—James A. Lisehora
Attorney, Agent, or Firm—Sughrue, Mion, Zinn, Macpeak & Seas

[57] ABSTRACT

A dock leveler has a frame mounted at a dock, a deck pivoted at one end to said frame and a lip pivotally attached to said deck at the other end thereof. The deck is movable between a first operable position where the deck is substantially horizontal and the lip extended, a second operative position where the lip hangs pendant and the deck is declined and an inoperative position where the deck is substantially horizontal and the lip hangs pendant. A barrier is mounted to have a raised operative position protruding above the deck and an inoperative position flush with the deck. A mechanical linkage automatically raises the barrier when the deck is in the inoperative position and permits the barrier to be lowered to its inoperative position when the deck is in either operative position. The linkage is responsive to both movement of the deck and the position of the lip.

26 Claims, 15 Drawing Sheets

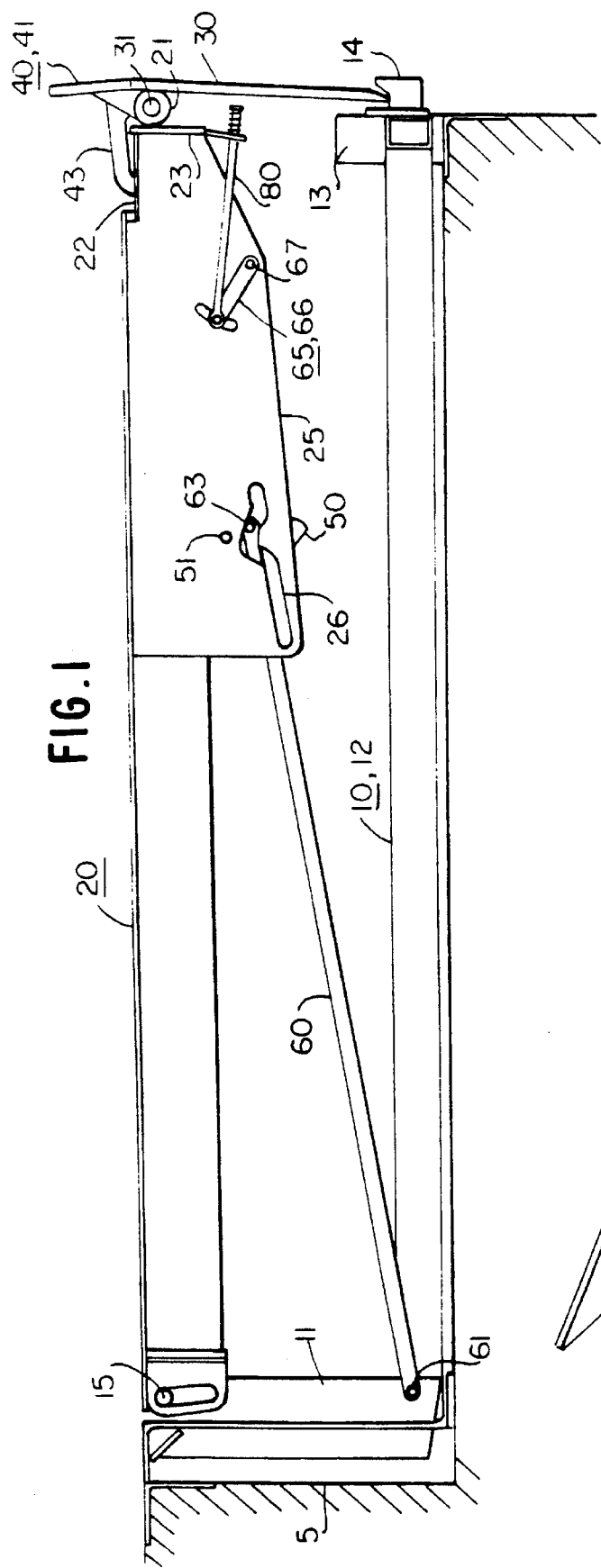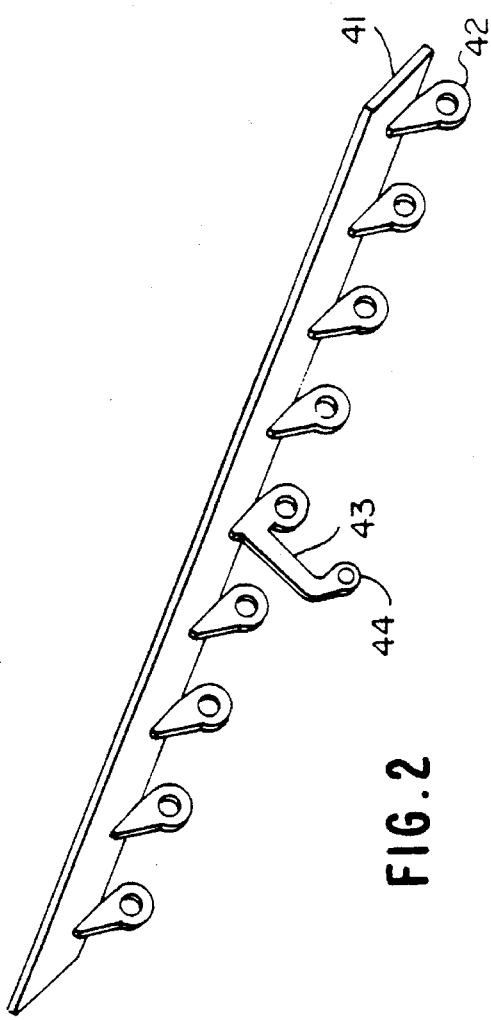

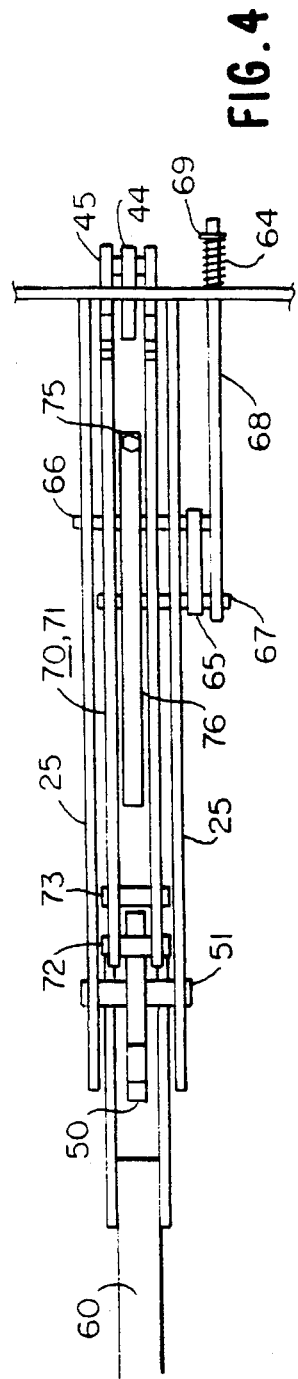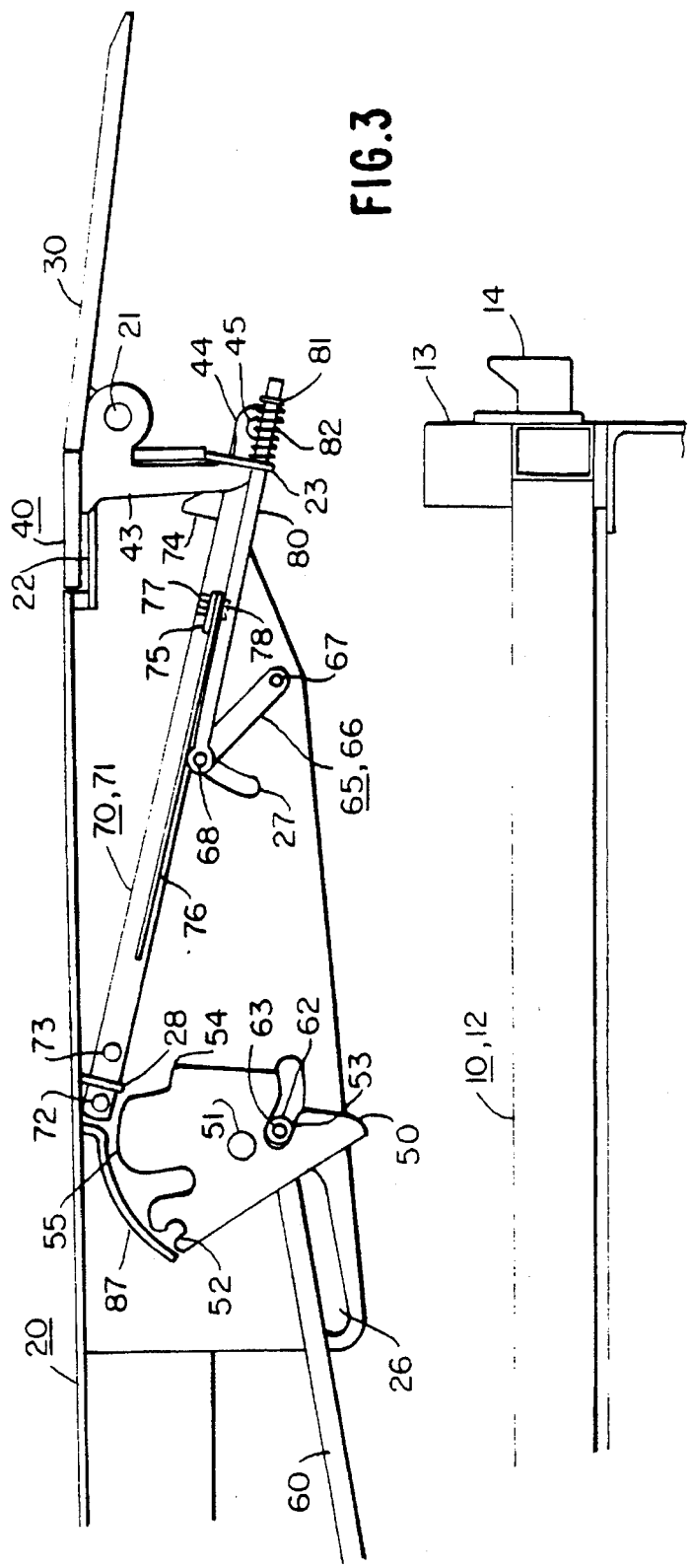

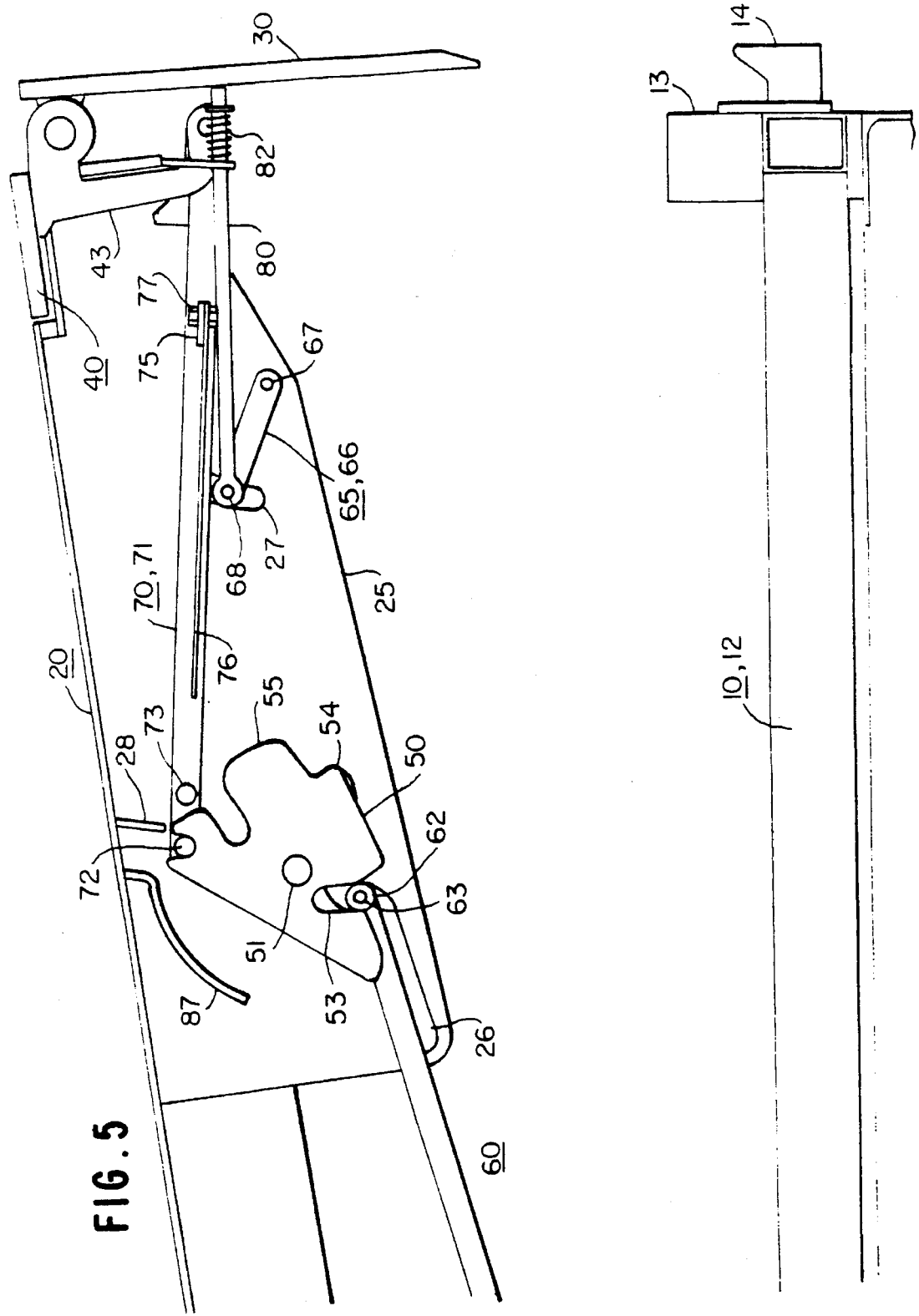

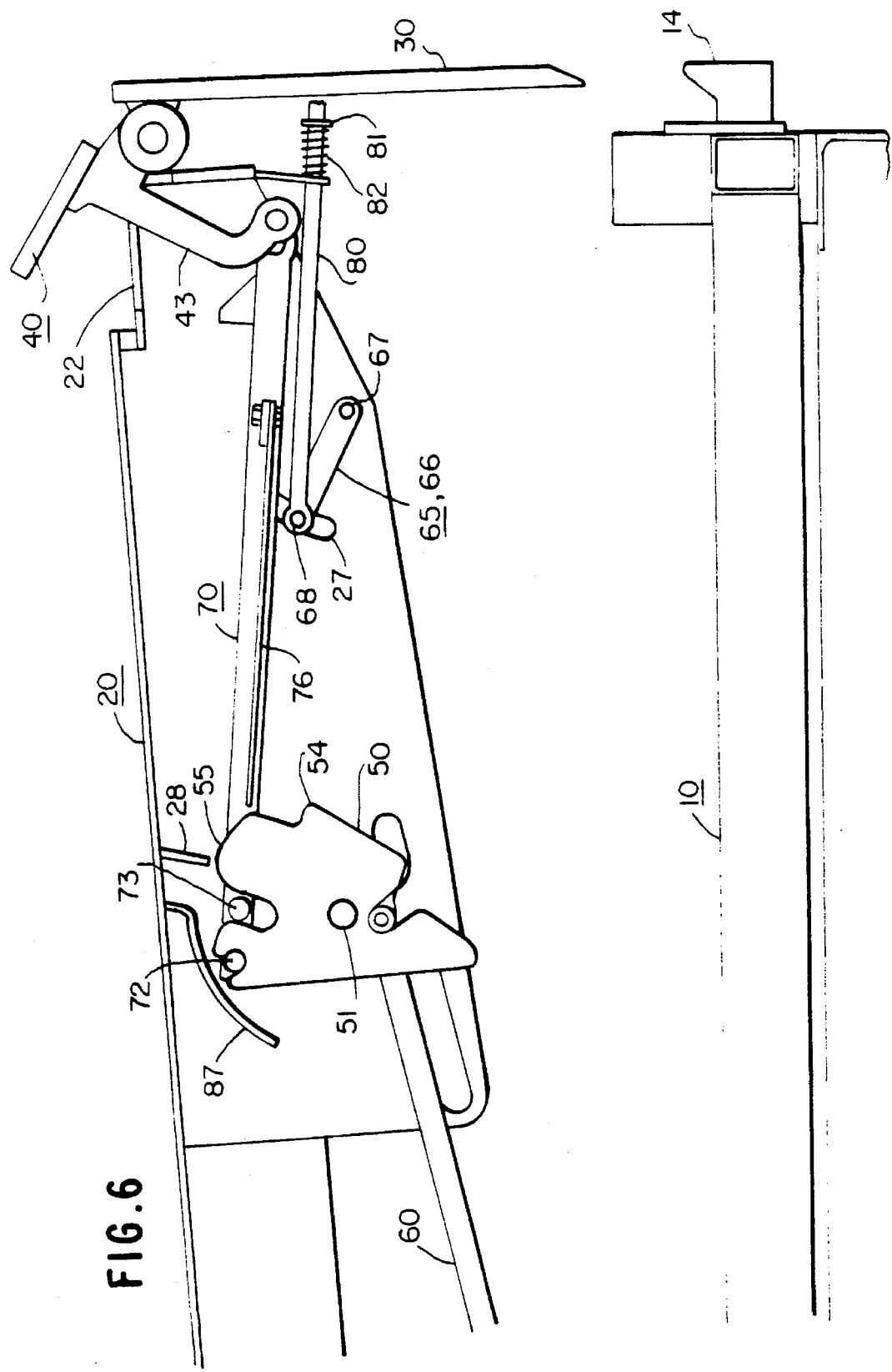

5,553,343

DOCK LEVELER WITH FOLDING BARRIER LIP

BACKGROUND OF THE INVENTION

This invention relates to an actuating mechanism for a lip barrier on a dock leveler. Several techniques of providing a run-off barrier at the outer end of a dock leveler are known in the art. The simplest method is to extend the rear edge of the folding lip so that a barrier is raised when the lip is folded in the stored or pendant position, and is lowered when the lip is extended. This method is sometimes known as the "Post Office" lip barrier because it is often specified by the United States Postal service. Although simple in operation, it has a limitation in that it restricts access to the transport trailer when the lip is stored to allow "end loading". This is the condition in which the placement of cargo at the rear of the trailer is accomplished without having the lip rest on the bed of the trailer.

Other devices which allow the barrier to be lowered for end loading are known, such as shown in U.S. Pat. No. 4,920,598 but they require complex structure, expensive machined parts, and they still have limitations. For example the device shown in the '598 patent cannot lower the barrier when the dock leveler is stored unless safety legs are provided, and a means to allow the operator to activate the legs must be provided. Conversely, the barrier cannot be raised when the dock leveler is fully lowered for below-dock end loading, although the chance of a run-off accident is greatly increased when the dock leveler is in a declined, i.e. downwardly sloping position. In addition, because the lip is carried by lip keepers when the dock leveler is stored, the significant change in weight carried by the dock leveler restricts its use to hydraulic dock levelers. Some barriers are connected directly to the lip and have the same limitations as the Post Office lip.

Others can be actuated independently but require an external actuator such as a hydraulic cylinder to raise them.

SUMMARY OF INVENTION

This invention is a mechanism which automatically causes the barrier to be raised each time the leveler is stored, yet allows the dock operator to lower the barrier both at dock level and below dock. In addition, no extra power is required, so the device is suitable for mechanical dock levelers as well as hydraulic ones. In accordance with this invention a dock leveler has a frame mounted at a dock, a deck pivoted at one end to said frame and a lip pivotally attached to the deck at the other end thereof. The deck is movable between a first operable position where the deck is substantially horizontal and the lip extended, a second operative position where the lip hangs pendant and the deck is declined and an inoperative position where the deck is substantially horizontal and the lip hangs pendant. A barrier is mounted to have a raised operative position protruding above the deck and an inoperative position flush with the deck.

A mechanical linkage automatically raises the barrier when the deck is restored to the dock-level position and permits the barrier to be lowered to its inoperative position when the deck is in either operative position. The linkage is responsive to both movement of the deck and the position of the lip. As a result, the barrier is raised or lowered dependent on the position of the lip when the deck is above the level of the dock.

BRIEF DESCRIPTION OF THE DRAWING

FIG. 1 is a side view of a loading dock with a dock leveler installed in a pit in accordance with a first preferred embodiment of this invention;

FIG. 2 is a perspective view of the folding barrier assembly;

FIG. 3 is a sectional side view of the barrier mechanism when the dock leveler has the lip extended onto a transport trailer;

FIG. 4 is a sectional top view of the barrier mechanism in FIG. 3;

FIG. 5 is a sectional view similar to FIG. 3 but with the dock leveler raised from the trailer and the lip 30 folded for storage at dock level;

FIG. 6 is a sectional view illustrating the dock leveler as the deck assembly has partially lowered and the barrier starting to raise;

DESCRIPTION OF PREFERRED EMBODIMENTS

Figure 7:
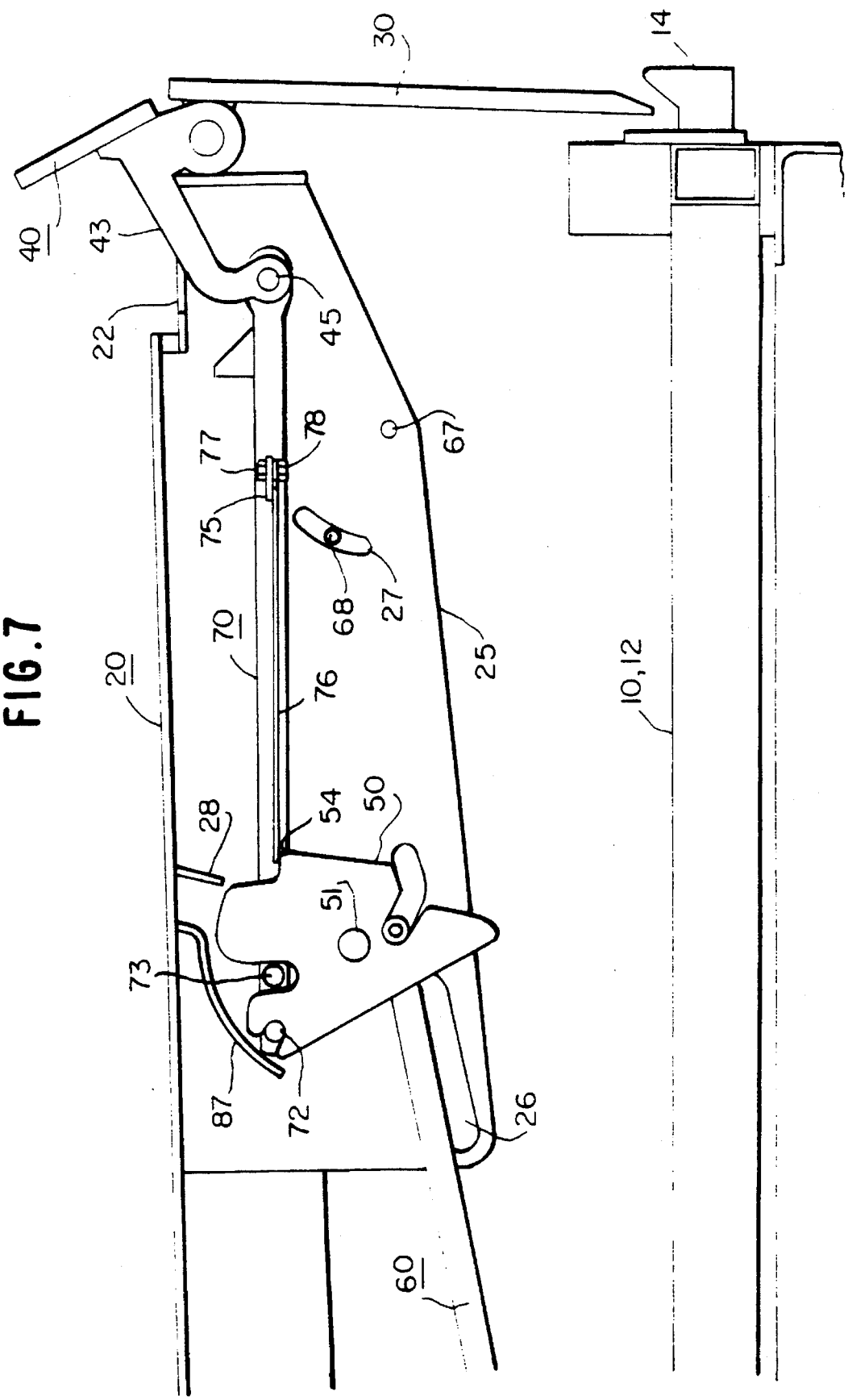
FIG. 7 is a sectional view illustrating the deck assembly lowered almost to floor level and the barrier raising.

Referring now to FIGS. 1–13 a first preferred embodiment of this invention will be described. FIG. 1 is a side view of a loading dock with a pit 5 formed into the dock floor. A dock leveler comprises a frame assembly 10 secured into the pit, a deck assembly 20, and a lip assembly 30. The frame assembly has a back frame 11 and a sub-frame 12. These frame members are anchored into the pit by retaining members, not illustrated. The lip keepers 14 support the lip 30 when the dock leveler is stored with the lip folded.

Figure 9:
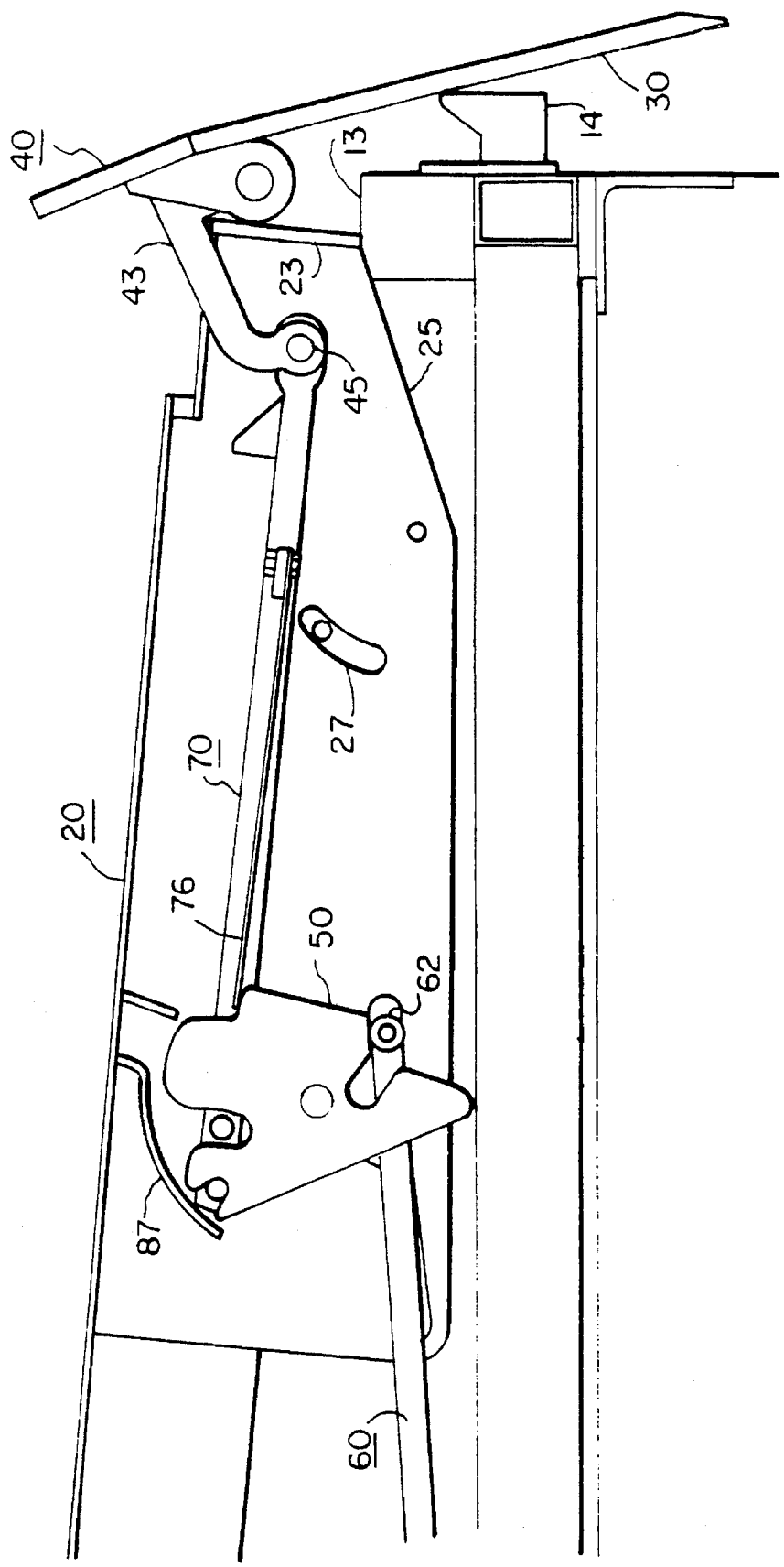
FIG. 9 is a sectional view illustrating the leveler in a below-dock end-loading position with the barrier assembly extended.
Figure 12:
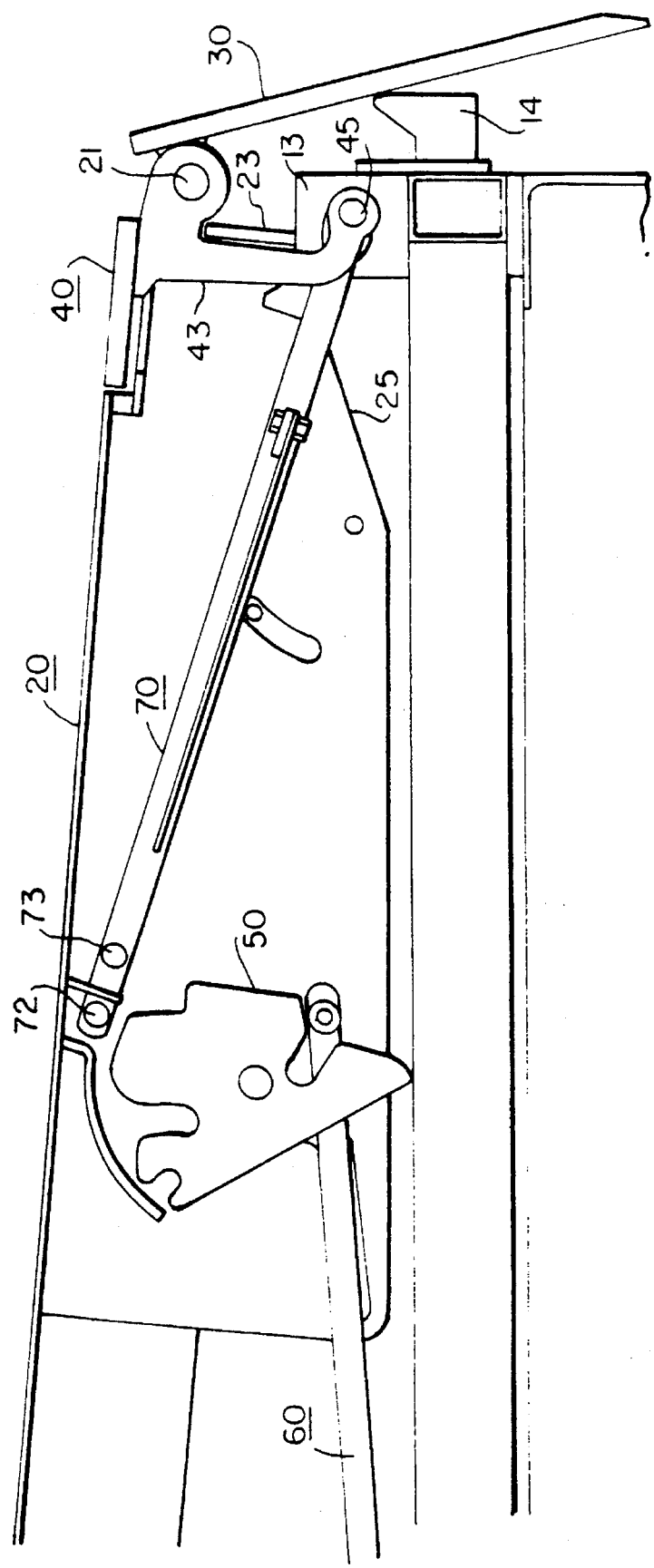
FIG. 12 is a side sectional view illustrating the leveler in below-dock end-loading with the barrier assembly retracted.

Ramp stops 13 engage the bottom of the front header plate 23 to limit the downward travel of the deck assembly as shown in FIGS. 9 and 12. The rear of the deck assembly 10 pivots about hinge pins 15 carried by the back frame 11. The lip assembly 30 pivots about the lip hinge pin 31 which passes through a series of hinge tubes 21 on the front of the deck assembly. The deck assembly and lip assembly are controlled in a conventional manner, not illustrated. The leveler may be either actuated with hydraulic cylinders to raise the deck and extend the lip, or the deck may be raised by springs and the lip extended by mechanical linkage.

A barrier assembly 40 extends above the deck to prevent a fork truck from rolling off the dock. The barrier assembly comprises a barrier plate 41 and a series of hinge support plates 42 as shown in FIG. 2. The support plates 42 pivot on the lip hinge pin 31. One support plate carries a control arm 43 which has a pivot boss 44. To enhance the operation with a mechanical dock leveler, the barrier assembly 40 may be counterbalanced by a spring (not shown). A recess 22 is formed in the front of the deck assembly to store the barrier when the lip is extended on to a transport trailer as shown in FIG. 3.

Figure 11:
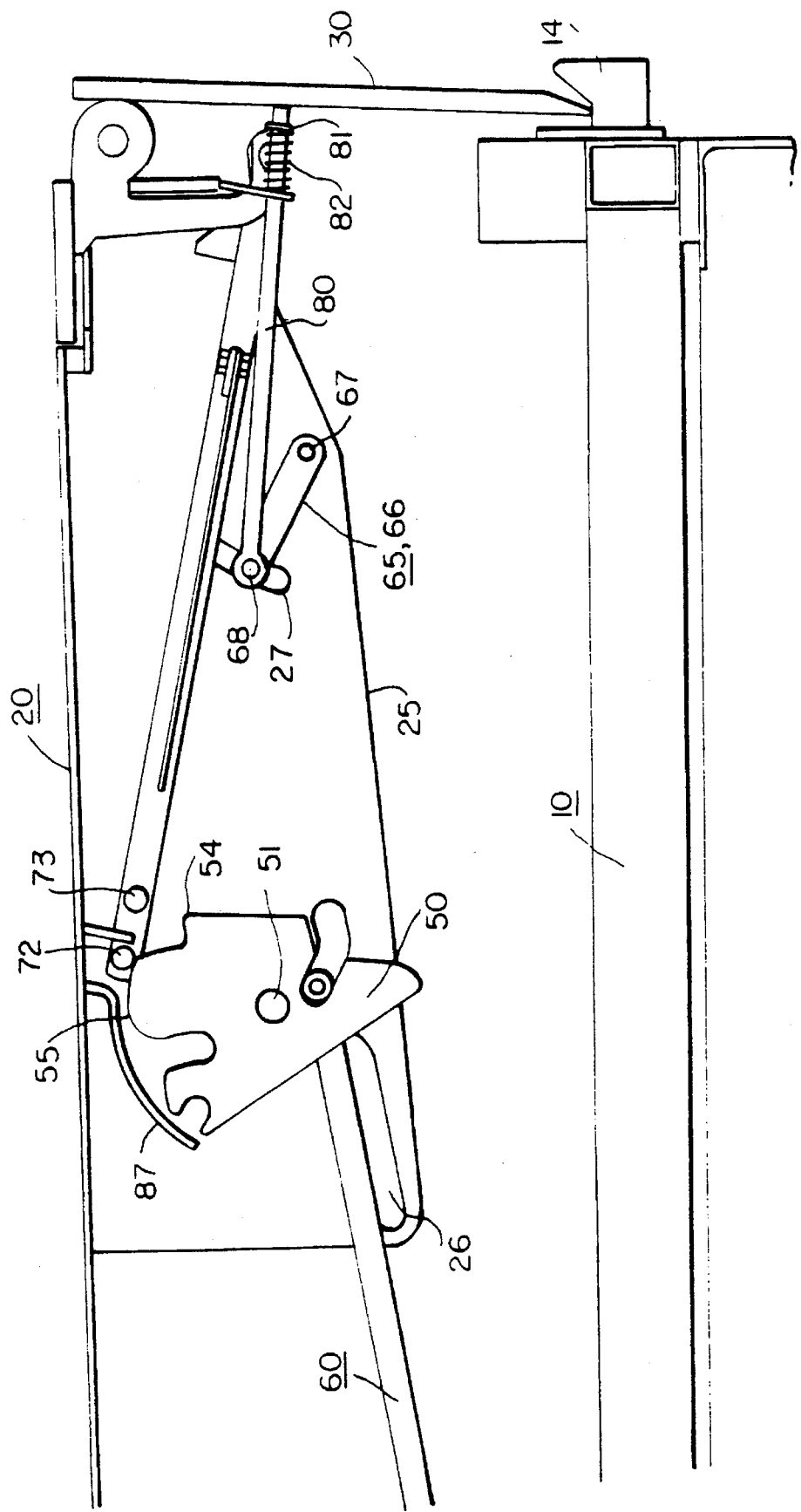
FIG. 11 is a side sectional view of the deck assembly lowered to floor level and the barrier assembly retracted for end loading.

FIG. 3 is a sectional view through the center of the barrier mechanism when the dock leveler has the lip extended onto a transport trailer. The lever arm assembly 65 and push rod 60 are superimposed to show their relationship with the barrier mechanism. FIG. 4 is a top view with the deck plate 20 removed. A latch arm assembly 70 is carried by pin 45 and comprises a pair of side bars 71, cross pins 72 and 73, a deflecting cam 74, a spring anchor plate 75, and a spring 76 fastened by a bolt 77 and nut 78. A pair of support brackets 25 are attached to the underside of the deck assembly 20 and a cam track 26 is cut into each bracket. A crank assembly 50 pivots about a pin 51 through the brackets 25. A guide-shield 87 is affixed to the lower portion of the deck 20 to prevent damage to the mechanism. A slot 52 is formed into the end of the crank to engage the pin 72 in the end of the latch arm assembly 70. A cam slot 53 is cut into the lower end of the crank assembly 50. A first spring cam lobe 54 protrudes from the front of the crank 50 and a second cam lobe 55 controls the position of the latch arm assembly 70 when the barrier is lowered at dock level as shown in FIG. 11. A push rod assembly 60 pivots about a pin 61 carried by the frame assembly 10. The other end of the push rod assembly has three cam rollers 62 on a pivot shaft 63. The two outer cam rollers 62 are guided by the cam track 26 in each bracket 25. The middle roller engages the cam slot 53 to control the rotational position of the crank assembly 50.

As shown in FIG. 3, the latch 70 is held in a raised inoperative position by the control arm assembly 65 which comprises an arm 66, a pivot pin 67 through the brackets 25, a control pin 68 which passes through a slot 27 in the bracket 25 and under the latch arm 70 to support it. A push rod 80 pivots about the pin 68 and passes through a front header plate 23 on the front of the deck assembly 20. A spring 82 is trapped between the front of support bracket and a flange 81 on the push rod 80. A guide shield 87 ensures that the latch arm 70 remains engaged in the crank 50, and the guide 28 controls the position of latch arm 70 when it is raised as shown in FIG. 3.

Figure 8:
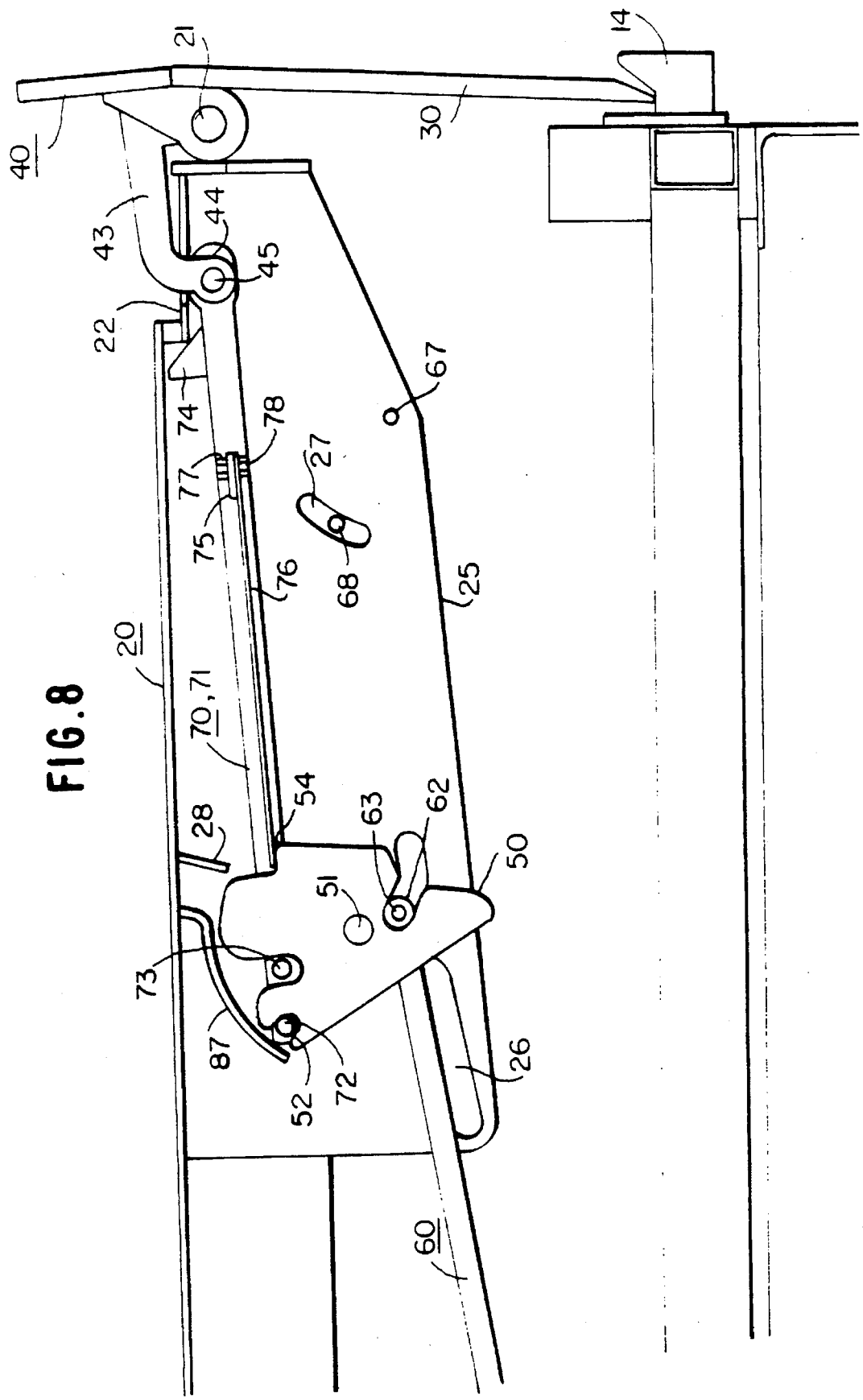
FIG. 8 is a sectional view illustrating the deck assembly lowered to floor level and the barrier assembly fully extended.

FIG. 5 is a sectional view similar to FIG. 4 but with the dock leveler raised from the trailer and the lip 30 folded for storage at dock level. The lip has forced the push rod 80 to compress the spring 82 and rotate the control arm assembly 65 to a lower position. The latch arm assembly 70 has fallen and the pin 72 has engaged the slot 52 on the crank assembly 50. FIG. 6 shows the dock leveler as the deck assembly 20 has partially lowered. As the deck assembly lowers, the push rod roller 62 moves forward in the cam track 26 and causes the crank assembly 50 to rotate counterclockwise. The slot 52 draws the pin 72 and the latch arm assembly 70 rearward and causes the barrier assembly 40 to rotate clockwise and protrude above the top of the deck assembly 20. FIG. 7 illustrates the deck assembly 20 lowered nearly to floor level. As the barrier assembly 40 has rotated upward, the angle between the lever arm 43 and the latch arm assembly 70 has been significantly reduced, reducing the mechanical advantage. However, the cam lobe 54 has engaged the spring 76 and as the crank 50 rotates, the latch arm assembly 70 also rotates counter clockwise and raises the barrier. FIG. 8 shows the deck assembly 20 lowered to floor level and the barrier assembly 40 fully extended. Thus the barrier assembly is automatically raised each time the lip is folded and the dock leveler is restored to floor level.

When the deck starts to raise from the position shown in FIG. 8, the crank 50 rotates clockwise, the latch arm assembly 70 moves forward and the deflecting cam 74 forces the control arm 43 down to ensure that the barrier starts to lower. The action of the barrier assembly is similar to that of the "Post Office" lip except that the barrier 40 can rotate independently of the lip assembly 30. Also like the "Post Office" lip design, the barrier will remain raised if the deck assembly is lowered for below-dock end loading. This is achieved by slightly raising the deck assembly 20 so that the lip assembly 30 clears the top of the lip keepers 14 as shown in FIG. 7. When the lip is rotated outward of the lip keepers, the deck assembly can be lowered until the header plate 23 contacts the ramp stops 13 as shown in FIG. 9. The deck assembly is now inclined downward but the barrier 40 is still raised. The spring 76 not only assists in raising the barrier as shown in FIG. 8, but also provides some resilience to allow the barrier to be rotated rearward by the lip as it moves outward to clear the lip keepers.

Figure 10:
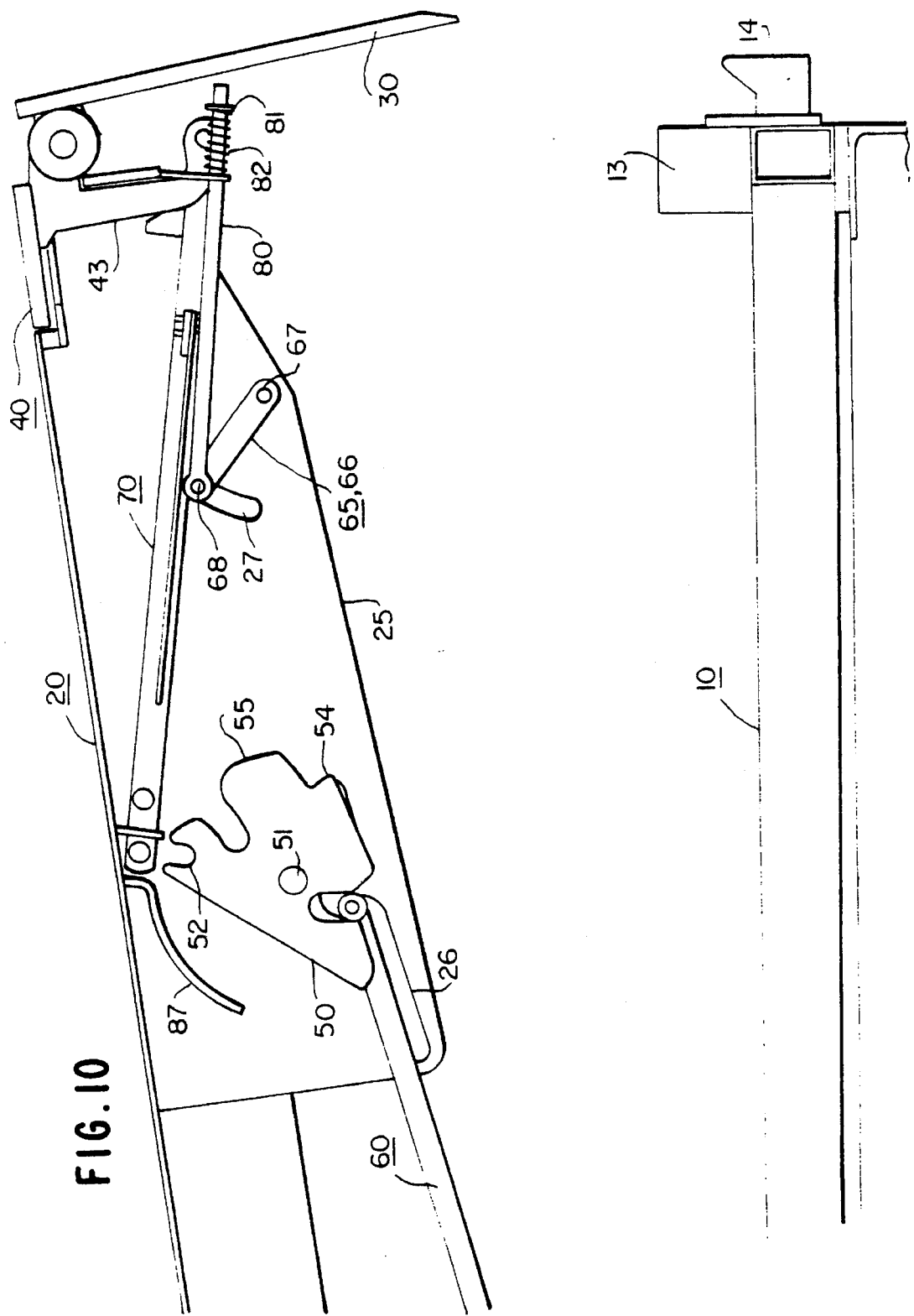
FIG. 10 is a side sectional view similar to FIG. 5 except with the lip slightly forward of the fully pendant position.

The mechanism thus offers an important advantage over other devices in the manner in which the barrier assembly can be lowered either at dock level or below dock. To lower the barrier assembly, the deck is raised as shown in FIG. 3 which ideally is about 10 or 12 inches above floor level. If the lip is partially extended as shown in FIG. 10, then the spring 82 pulls the rod 80 forward and the latch arm 70 is held in an inoperative position by the control arm 65. After the deck starts to lower and the crank 50 has started to rotate, the lip can then be retracted to store at floor level as shown in FIG. 11. When the spring 82 is compressed, the latch arm will be allowed to fall but will not engage the pin 52 on the crank assembly. Alternatively, the lip may be held partially extended and the deck assembly lowered to below dock with the barrier lowered as shown in FIG. 12.

The operation of the device can be summarized as follows. The dock leveler with folding lip barrier in accordance with this invention has four operative positions other than the normal operative mode with the lip extended on to the bed of a transport vehicle. These are:

(a) dock leveler stored at dock level with barrier raised, (b) dock leveler stored at dock level with barrier lowered, (c) dock leveler below dock with barrier raised, (d) dock leveler below dock with barrier lowered.

When the dock leveler is in the operative position with the lip extended on to the bed of a transport vehicle, the barrier assembly 40 is automatically lowered to the inoperative position and the control arm assembly 65 holds the latch arm 70 raised out of engagement with the cam assembly 55 as shown in FIG. 3. When the dock leveler is restored to the dock-level position, it must first be raised to allow the lip to fall pendant as shown in FIG. 5. When the lip is fully pendant, the lip moves the push rod 60, lowering the control arm 65 and allowing the latch arm 70 to engage the slot in the cam assembly 50. When the dock is lowered to the stored dock level position, the cam rotates and raises the barrier to the operative position as shown progressively in FIGS. 6, 7 and 8. Thus the barrier is automatically raised each time the leveler is restored.

To prevent the barrier from being raised as the leveler descends to dock level, the operator partially extends the lip 5 while the leveler is still above dock as shown in FIG. 10. The latch arm does not engage the cam 50 and the leveler descends without the barrier being raised as shown in FIG. 12. Because the lip is partially extended, the lip will pass by the lip keepers and the leveler will descend to the below-dock end-loading position. For dock-level end-loading, the operator retracts the lip before the tip of the lip reaches the lip keepers. The lip then rests in the lip keepers as shown in FIG. 11.

Figure 13:
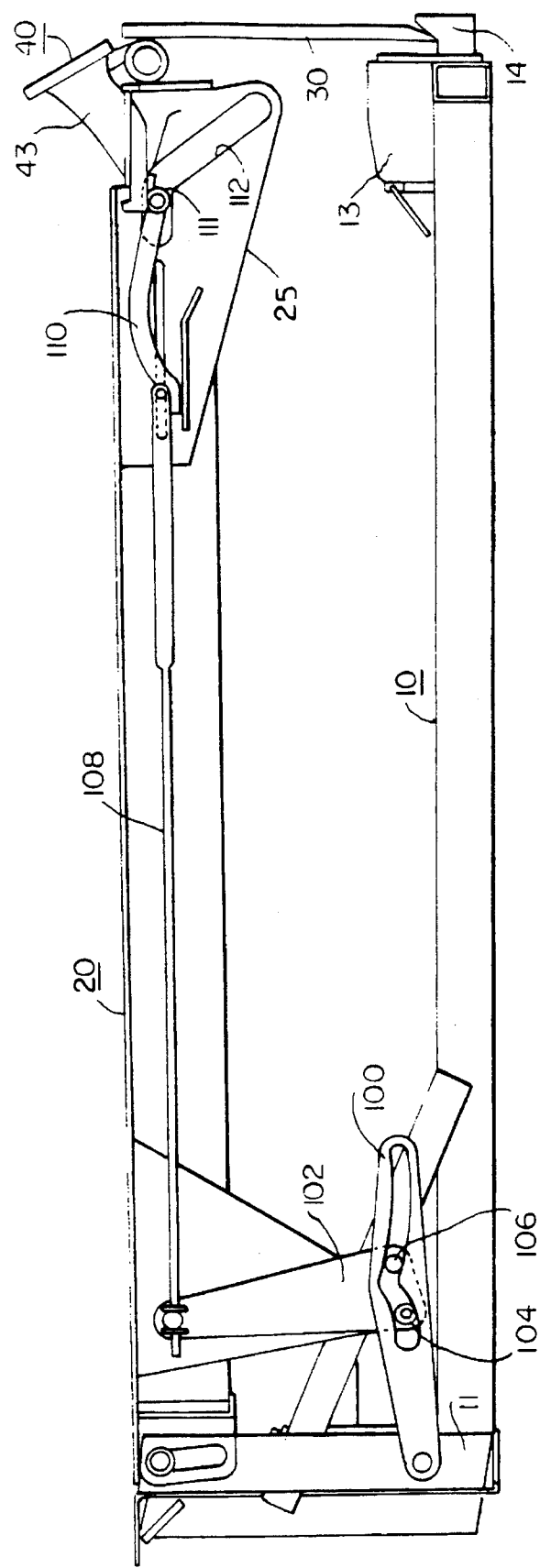
FIG. 13 is a side sectional view of a second preferred embodiment to control the barrier position.

It is obvious to one skilled in the art that there are other forms of the mechanism which will operate in the same modes of operation. FIG. 13 illustrates a second preferred embodiment where the cam 100 is pivoted on the back frame 11 and the crank 102 is caused to rotate by two cam rollers 104, 106. The rod 108 is coupled to a link 110 having a cam roller 111 in a second cam track 112 cut in bracket 25 to raise the barrier 40 . In this embodiment the link for the latch arm and is in contact with the control member 43 by sliding bearing contact. There is no positive linkage moving the control rod in both directions as in the first embodiment rather, the control rod follows movement of the member 110.

Figure 14:
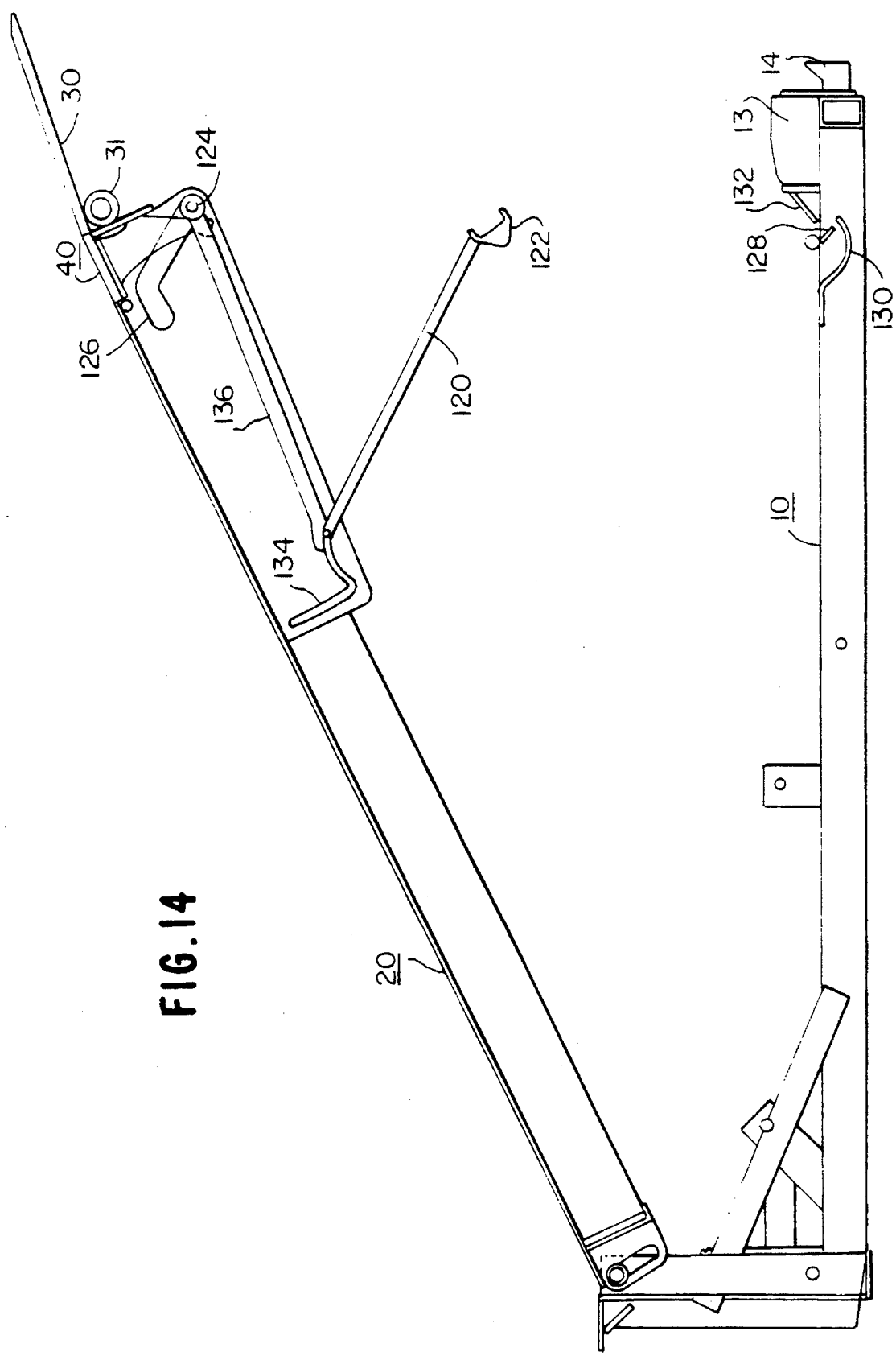
FIGS. 14 & 15 are side views of a third preferred embodiment of this invention to control the barrier position.
Figure 15:
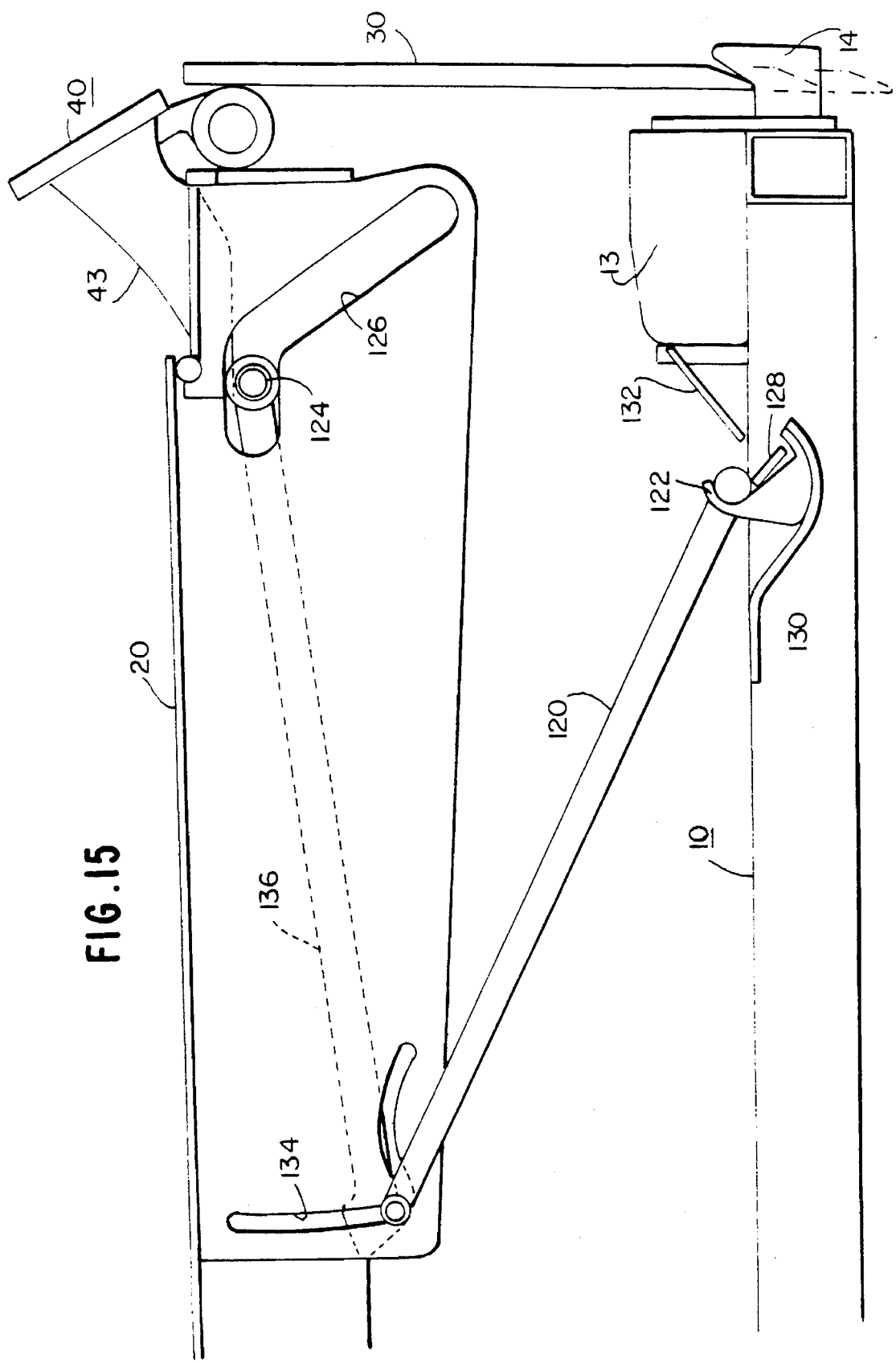

FIG. 14 illustrates a third preferred embodiment with a push rod 120 which is suspended from the deck. FIG. 15 shows the push rod 120 after it moves the latch arm 136 having cam rollers 124 in the slot 126 to raise the barrier 40. The barrier can be prevented from raising by lifting the push rod 120 so that it does not engage the bracket 128 on the frame 10. As illustrated in FIGS. 14 and 15 the push rod 120 has an engagement member 122 affixed to the distal end. A guide 130 mounted on the frame 10 directs the engagement member 122 into contact with the bracket 128. When engagement occurs, the other end of the rod in the guide slot 134 moves to the left, as illustrated in FIG. 15. This in turn causes the latch arm 136 to move upward in slot 126. Since it is in contact with control arm 43 of the barrier 40, the barrier is raised.

If the leveler is to operate in the below dock mode, the push arm 120 is shifted so that the engagement member contacts ramp 132. As the deck is lowered the rod 120 will slide on the ramp but not move in the guide slot 134 so that the barrier will remain retracted.

Figure 16:
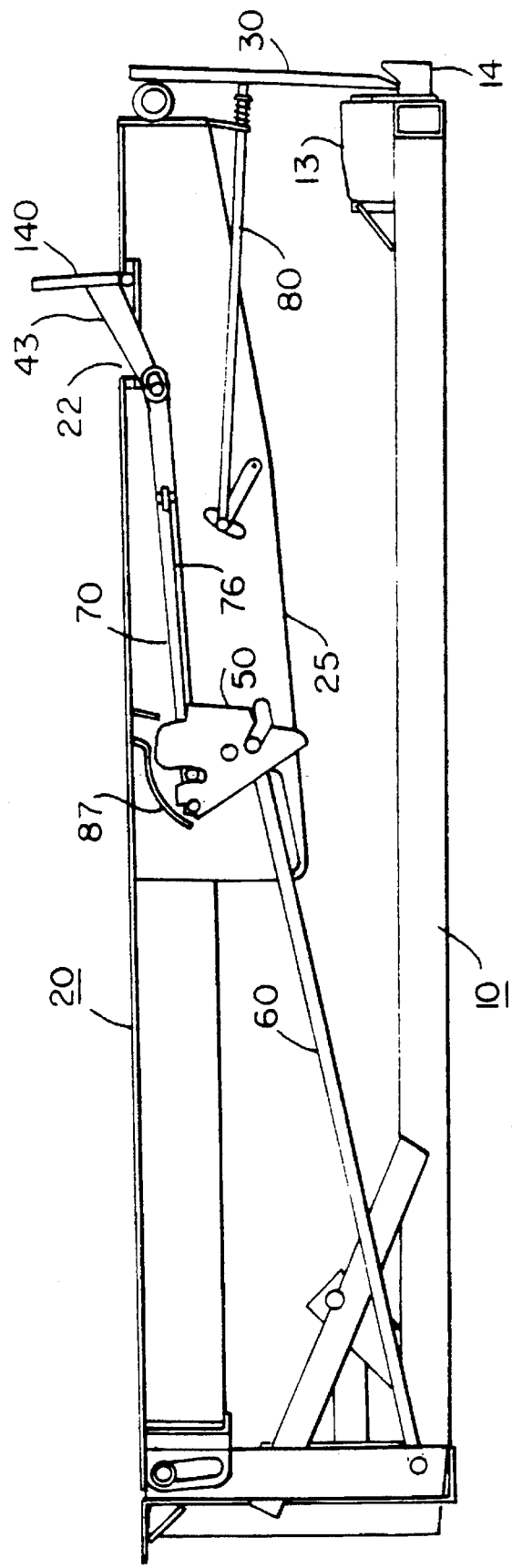
FIG. 16 is a side sectional view of a fourth preferred embodiment of this invention used to raise a folding barrier positioned between the front and rear ends of the deck.
Figure 17:
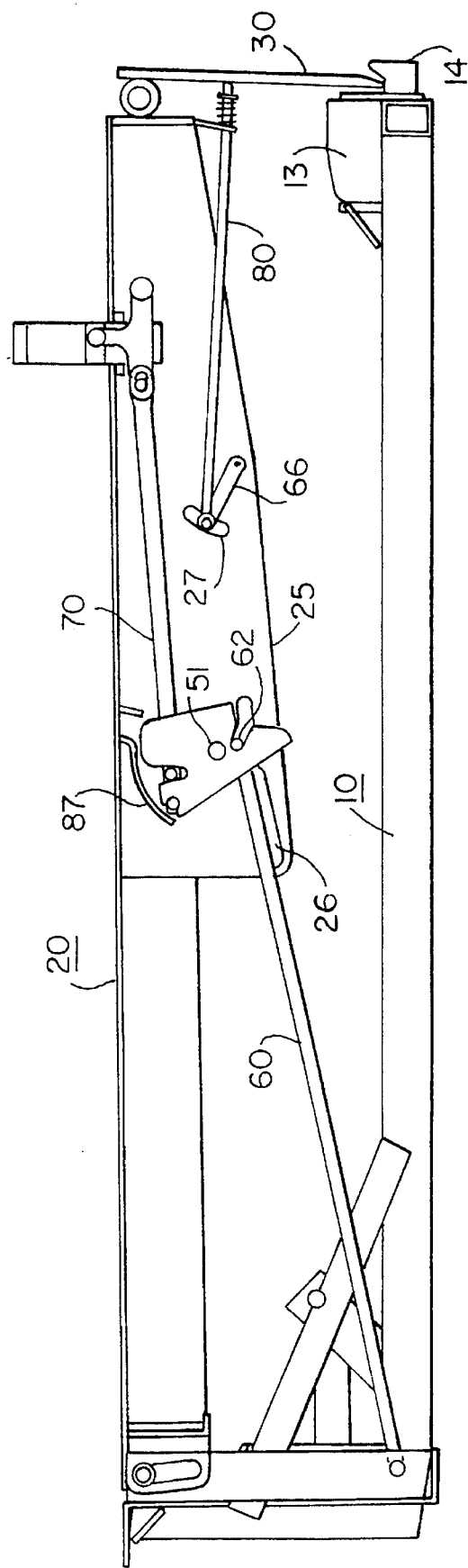
FIG. 17 is a side sectional view of a fifth preferred embodiment of this invention used to raise a barrier perpendicular to the deck and located between the front and rear ends.

The mechanisms described are not limited to being used to rotate a barrier pivoting about the lip hinge. FIG. 16 shows the fourth preferred embodiment of the mechanism of the first preferred used to raise a folding barrier between the front and rear ends of the deck. FIG. 17 shows the fifth preferred embodiment of the mechanism used to raise a barrier which raised perpendicular to the deck 20 between the front and Tear ends thereof. In these two embodiments, elements having like characteristics and construction to those in the first preferred embodiment carry the same numerals. In FIG. 16 the barrier 140 is separate from the lip 30 and normally flush with the surface of the 20 by being housed in the recess 22. The operation of the latch arm assembly is the same as in the first preferred embodiment by being coupled to a control arm 43.

Although the mechanisms all show the barrier raised as the deck is lowered, other forms of the mechanism could cause the barrier to be raised as the deck is raised, and the position of the lip to retain or release the barrier as the deck is lowered.

I claim:

1. A dock leveler comprising:

a frame mounted at a dock, a deck pivoted at one end to said frame, a lip pivotally attached to said deck at the other end thereof, said deck movable between a first operative position where said deck is substantially horizontal and said lip extended, a second operative position where said lip hangs pendant and said deck is declined, a third operative position where said deck is substantially horizontal and said lip hangs pendant in a stored position, and an inoperative position where said deck is substantially horizontal with said lip hanging pendant and store, a barrier pivotally attached to said deck at the same position of attachment of said lip to have a raised operative position protruding above said deck and an inoperative position flush with said deck, and means responsive to deck position to automatically raise said barrier when said deck is in said inoperative position and to permit said barrier to be lowered to its inoperative position when said deck is in any operative position.

2. The dock leveler of claim 1 wherein said means to automatically raise said barrier comprises a control arm attached to said barrier, a push rod having one end operably connected to said deck and responsive to movement of said deck and, a latch arm operably connected to said control arm and responsive to movement of said push rod to elevate said barrier as said deck is placed in said inoperative position.

3. The dock leveler of claim 2 further comprising a crank assembly interposed between said push rod and said latch arm, said crank assembly having a plurality of slots, said push rod in operable contact with said crank assembly and engaging one of said slots to rotate said crank assembly in a first direction and said latch arm selectively engaging another of said slots and movable in response to said rotation of said crank assembly to raise said barrier.

4. The dock leveler of claim 3 further comprising a control arm assembly responsive to the position of said lip, said control arm assembly contacting said latch arm and movable in a first direction to displace said latch arm from said crank assembly and moveable in a second direction in response to said lip hanging in a pendant position to permit said latch arm to engage said crank assembly.

5. The dock leveler of claim 3 wherein said barrier is positioned adjacent said lip at said other end of said deck.

6. The dock leveler of claim 3 wherein said barrier is positioned intermediate the ends of said deck.

7. The dock leveler of claim 2, further comprising bracket means mounted to the underside of said deck, a slot in said bracket means, said push rod engaging said slot and movable therein, said push rod having the other end thereof coupled to said frame.

8. The dock leveler of claim 7 further comprising a second slot in said bracket means, said latch arm having an end mounted in said second slot, said end in contact with said control rod to raise and lower said barrier.

9. The dock leveler of claim 8 wherein said bracket means comprises first and second brackets, said first slot positioned in said first bracket and said second slot positioned in said second bracket.

10. The dock leveler of claim 8 wherein said bracket means comprises a single bracket and said latch arm having another end mounted in said first slot and coupled to said push rod for movement therewith.

11. The dock leveler of claim 10 wherein said push rod is disengagable from said frame as said deck is elevated, said push rod engaging a horizontal member of said frame as said deck is lowered and movable in said first slot to move said latch arm, thereby elevating said barrier.

12. The dock leveler of claim 2 further comprising a bracket mounted to the underside of said frame, a slot in said bracket, a link coupled to said latch arm and movable in said slot, said control arm riding on said link and responsive to motion thereof to raise and lower said barrier.

13. The dock leveler of claim 2 further comprising a bracket mounted on the underside of said deck, said bracket having first and second slots therein, said push rod having one end mounted for movement in one of said slots, a control arm assembly mounted on said bracket and engaging said second slot, said control arm assembly responsive to movement of said lip to selectively position said latch arm into operative engagement with said push rod.

14. The dock leveler of claim 13 further comprising a crank member mounted on said bracket, said latch arm and said push rod selectively engaging said crank member, whereby movement of said push rod causes said crank member to move in one direction causing said latch member, when it engages said crank member to raise said barrier and wherein extension of said lip causes said control arm assembly to disengage said latch arm from said crank member thereby lowering said barrier.

15. A dock leveler comprising:
a frame mounted at a dock, a deck pivoted at one end to said frame, a lip pivotally attached to said deck at the other end thereof, said deck movable between an operable position where said deck is substantially horizontal and said lip extended and an inoperative position where said deck is substantially horizontal and said lip hangs pendant, a barrier mounted to have a raised operative position protruding above said deck and an inoperative position flush with said deck, means to automatically raise said barrier when said deck is substantially horizontal dependent on the position of said lip, comprising a control arm attached to said barrier, a push rod operably connected to said deck and responsive to movement of said deck and, a latch arm operably connected to said control arm and responsive to movement of said push rod to elevate said barrier as said deck is placed in said inoperative position and further comprising a crank assembly interposed between said push rod and said latch arm, said crank assembly having a plurality of slots, said push rod in operable contact with said crank assembly and engaging one of said slots to rotate said crank assembly in a first direction and said latch arm selectively engaging another of said slots and movable in response to said rotation of said crank assembly to raise said barrier.

16. The dock leveler of claim 15 further comprising a control arm assembly responsive to the position of said lip, said control arm assembly contacting said latch arm and movable in a first direction to displace said latch arm from said crank assembly and moveable in a second direction in response to said lip hanging in a pendant position to permit said latch arm to engage said crank assembly.

17. The dock leveler of claim 15 wherein said barrier is positioned adjacent said lip at said other end of said deck.

18. The dock leveler of claim 15 wherein said barrier is positioned intermediate the ends of said deck.

19. The dock leveler of claim 15 further comprising a bracket mounted to the underside of said frame, a slot in said bracket, a link coupled to said latch arm and movable in said slot, said control arm riding on said link and responsive to motion thereof to raise and lower said barrier.

20. The dock leveler of claim 15 further comprising a bracket mounted on the underside of said deck, said bracket having first and second slots therein, said push rod having one end mounted for movement in one of said slots, a control arm assembly mounted on said bracket and engaging said second slot, said control arm assembly responsive to movement of said lip to selectively position said latch arm into operative engagement with said push rod.

21. The dock leveler of claim 20 further comprising a crank member mounted on said bracket, said latch arm and said push rod selectively engaging said crank member, whereby movement of said push rod causes said crank member to move in one direction causing said latch member, when it engages said crank member to raise said barrier and wherein extension of said lip causes said control arm assembly to disengage said latch arm from said crank member thereby lowering said barrier.

22. A dock leveler comprising:
a frame mounted at a dock, a deck pivoted at one end to said frame, a lip pivotally attached to said deck at the other end thereof, said deck movable between an operable position where said deck is substantially horizontal and said lip extended and an inoperative position where said deck is substantially horizontal and said lip hangs pendant, a barrier mounted to have a raised operative position protruding above said deck and an inoperative position flush with said deck, means to automatically raise said barrier when said deck is substantially horizontal dependent on the position of said lip, comprising a control arm attached to said barrier, a push rod operably connected to said deck and responsive to movement of said deck and, a latch arm operably connected to said control arm and responsive to movement of said push rod to elevate said barrier as said deck is placed in said inoperative position and a bracket mounted to the underside of said deck, a slot in said bracket, said push rod engaging said slot and movable therein, said push rod having the other end thereof coupled to said frame.

23. The dock leveler of claim 22 further comprising a second slot in said bracket means, said latch arm having an end mounted in said second slot, said end in contact with said control rod to raise and lower said barrier.

24. The dock leveler of claim 23 wherein said bracket means comprises first and second brackets, said first slot positioned in said first bracket and said second slot positioned in said second bracket.

25. The dock leveler of claim 23 wherein said bracket means comprises a single bracket and said latch arm having another end mounted in said first slot and coupled to said push rod for movement therewith.

26. The dock leveler of claim 23 wherein said push rod is disengagable from said frame as said deck is elevated, said push rod engaging a horizontal member of said frame as said deck is lowered and movable in said first slot to move said latch arm, thereby elevating said barrier.

* * * * *